US010594854B2

(12) United States Patent
Ratnakar

(10) Patent No.: US 10,594,854 B2
(45) Date of Patent: Mar. 17, 2020

(54) LOCATION BASED PERSONAL ORGANIZER

(71) Applicant: Nitesh Ratnakar, Wheeling, WV (US)

(72) Inventor: Nitesh Ratnakar, Wheeling, WV (US)

( * ) Notice: Subject to any disclaimer, the term of this patent is extended or adjusted under 35 U.S.C. 154(b) by 0 days.

(21) Appl. No.: 16/427,278

(22) Filed: May 30, 2019

(65) Prior Publication Data

US 2019/0356772 A1 Nov. 21, 2019

Related U.S. Application Data

(63) Continuation of application No. 16/182,598, filed on Nov. 6, 2018, now abandoned, which is a continuation of application No. 12/046,358, filed on Mar. 11, 2008, now Pat. No. 10,122,845.

(51) Int. Cl.
| | |
|---|---|
| *G06F 16/00* | (2019.01) |
| *H04M 1/725* | (2006.01) |
| *G06F 16/9537* | (2019.01) |
| *H04M 1/2745* | (2020.01) |
| *G06F 16/9535* | (2019.01) |

(52) U.S. Cl.
CPC ..... *H04M 1/72572* (2013.01); *G06F 16/9535* (2019.01); *G06F 16/9537* (2019.01); *H04M 1/274508* (2013.01); *H04M 1/72566* (2013.01); *H04M 2250/10* (2013.01)

(58) Field of Classification Search
CPC ............ G06F 16/9535; G06F 16/9537; H04M 1/274508; H04M 1/274516; H04M 1/72566; H04M 1/72572; H04M 2203/253; H04M 2250/10; H04M 3/4931
See application file for complete search history.

(56) References Cited

U.S. PATENT DOCUMENTS

| | | | | |
|---|---|---|---|---|
| 5,654,908 | A * | 8/1997 | Yokoyama | G01C 21/362 701/538 |
| 7,398,081 | B2 * | 7/2008 | Moran | H04M 1/2745 455/414.1 |
| 7,411,518 | B2 * | 8/2008 | Ratnakar | G08B 21/24 340/932.2 |
| 8,700,310 | B2 * | 4/2014 | Jayanthi | G01C 21/26 701/408 |
| 2002/0102988 | A1 * | 8/2002 | Myllymaki | H04W 4/029 455/456.5 |
| 2005/0131740 | A1 * | 6/2005 | Massenzio | G01C 21/3415 705/2 |

(Continued)

*Primary Examiner* — Dinku W Gebresenbet
(74) *Attorney, Agent, or Firm* — Jundong Ma

(57) ABSTRACT

Present invention discloses a location specific personal organizer system for communication devices. Personal organizer, as a combined application with contact list of communication device or as a stand alone application; is provided with means to link task with anticipated location and corresponding GPS coordinates. Means is provided in GPS enabled communication device to determine if any task in personal organizer is due at its current location. Task due at current location is displayed on communication device. According to another aspect of the invention means is disclosed to auto fill information into data fields of contact list entry in communication device in response to information provided in a unique identifier data field of contact list entry.

7 Claims, 7 Drawing Sheets

(56) References Cited

U.S. PATENT DOCUMENTS

| | | | | |
|---|---|---|---|---|
| 2006/0058948 A1* | 3/2006 | Blass | ............... | G01C 21/343 |
| | | | | 701/408 |
| 2007/0271367 A1* | 11/2007 | Yardeni | ............ | G06Q 10/107 |
| | | | | 709/223 |
| 2009/0210148 A1* | 8/2009 | Jayanthi | ............. | G01C 21/26 |
| | | | | 701/467 |
| 2009/0222482 A1* | 9/2009 | Klassen | ............ | G06F 16/487 |

\* cited by examiner

US 10,594,854 B2

LOCATION BASED PERSONAL ORGANIZER

CROSS-REFERENCE TO RELATED APPLICATION

This application is a continuation application claiming priority under 35 U.S.C. § 120 to currently pending U.S. Non-provisional patent application Ser. No. 16/182,598, filed on Nov. 6, 2018, which is a continuation application claiming priority under 35 U.S.C. § 120 to currently pending U.S. Non-provisional patent application Ser. No. 12/046,358, filed on Mar. 11, 2008, now U.S. Pat. No. 10,122,845, issued on Nov. 6, 2018. The entire disclosures of all of the aforesaid prior applications are hereby incorporated by reference.

FIELD OF INVENTION

The present invention relates to personal organizer system and contact list of communication devices.

BACKGROUND AND PRIOR ART

Address book and personal organizer are two most common features used in personal communication devices such as mobile phones. Address book provides users means to store contact information of businesses and individuals. Usually address book provides users means to store contact information such as name, address, phone, fax, email, web site etc. In addition most modern personal communication devices enable speed dial of phone numbers contained in entry of address book. Personal organizer provides users means to enter planned tasks according to anticipated time of execution of corresponding tasks. Usually users are able to enter anticipated tasks into the personal organizer according to anticipated time of task i.e. date, day of the week, year, hour and minute etc. Most personal organizer systems have alarm feature to remind users of a task at a time prior to entered time of task as selected by user. However, another important feature applicable to any task i.e. location of anticipated task is not incorporated in any personal organizer system currently in use. Although personal organizer systems currently in use are able to remind users of tasks as a function of time, this sometimes is not useful as user is not present at the location of task at the time of reminder and hence is unable to execute said task. Moreover, many tasks are location critical as opposed to time critical. For example, user may want to be reminded to purchase milk when user is in a grocery store, irrespective of the time. Hence there remains a need for personal organizer system that enables user to be reminded of task as a function of location of user.

SUMMARY

Present invention discloses a GPS enabled contact list for communication devices. Means is provided in communication device to integrate GPS coordinates corresponding to physical address contained in its contact list. Personal organizer, as a combined application with contact list or as a stand alone application; is provided with means to link task with its anticipated location and corresponding GPS coordinates. Means is provided in GPS enabled communication device to determine if any task in personal organizer is due at its current location. Task due at current location is displayed on communication device. According to another aspect of the invention means is disclosed to auto fill information into data fields of contact list entry in communication device in response to information provided in a unique identifier data field of contact list entry.

DETAIL DESCRIPTION OF DRAWINGS

Figure 1:
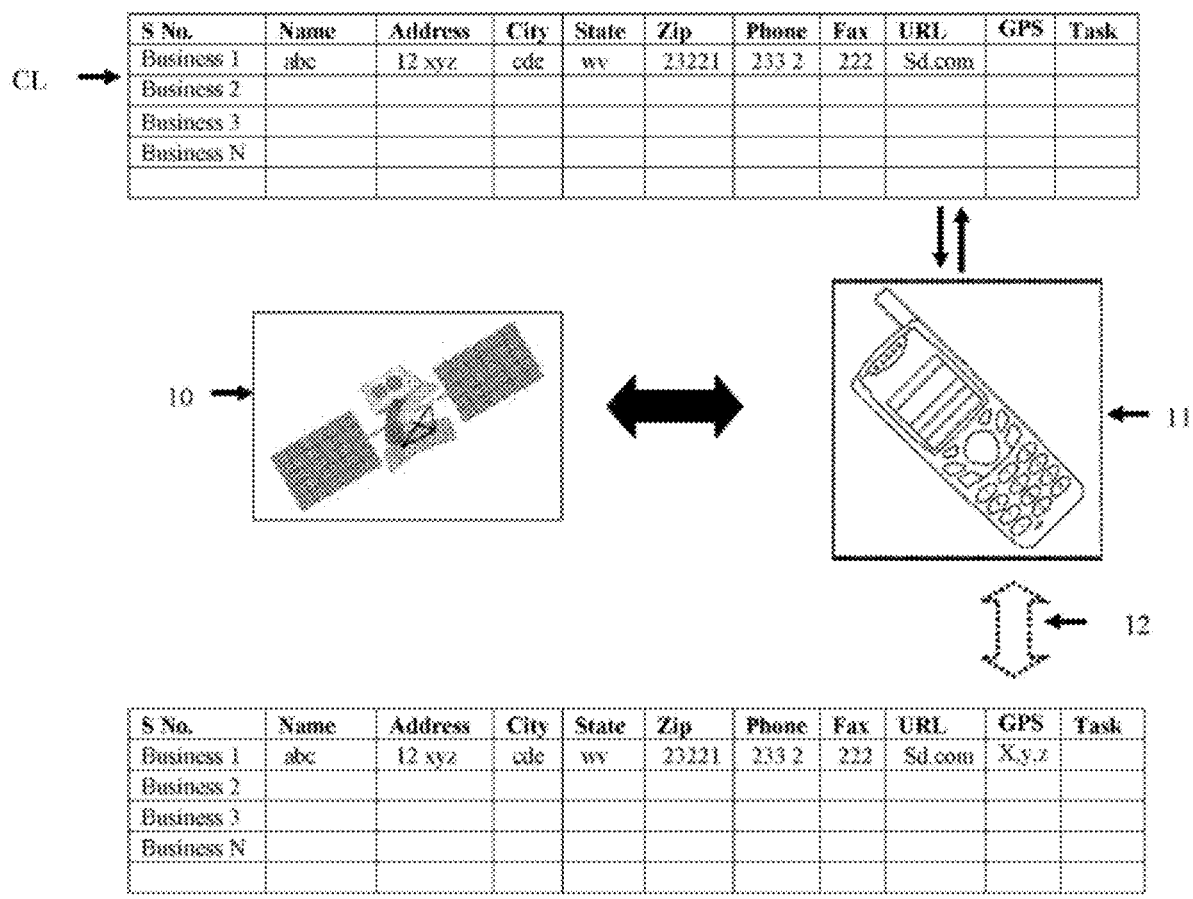
FIG. 1 shows first method of determination of GPS coordinates corresponding to physical address contained in contact list of communication device.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out one or several purposes of the present invention. It is important, therefore, that the claims be regarded as including such equivalent constructions insofar as they do not depart from the spirit and scope of the present invention.

Many personal communication devices, such as cellular phones come equipped with global positioning system (GPS) receiver which enables users determine their location. The location of communication device is determined by GPS via communication link with GPS Satellite and is represented as GPS coordinates. Additionally, by means of geo-coding, physical address corresponding to GPS coordinates can easily be determined. Other means of determining location of communication devices is also available, such as cellular tower location determination. As shown in FIG. 1, According to one aspect of the invention contact list (CL) is provided in communication device with means for users to enter contact information of individuals and businesses. Each contact list entry in contact list has data fields for name, physical address, phone, fax, email address, and web site URL. Additionally data field for entry of location specific task list is also provided in the contact list. According to one method, information in data fields of contact list entry, including physical address, is manually filed in by user. Additionally, as shown in FIG. 1, contact list contains data field for GPS coordinates corresponding to physical address of entity contained therein. According to one method, also shown in FIG. 1, means is provided for communication device (11) equipped with GPS receiver to communicate with GPS Satellite (10); and determine GPS coordinates corresponding to physical address contained in contact list entries (12); and subsequently save GPS coordinates in GPS data field of corresponding contact list entries. In communication devices without CIPS receiver, GPS coordinates corresponding to physical address contained in contact list can be obtained from one of existing providers via a web server.

Figure 2:
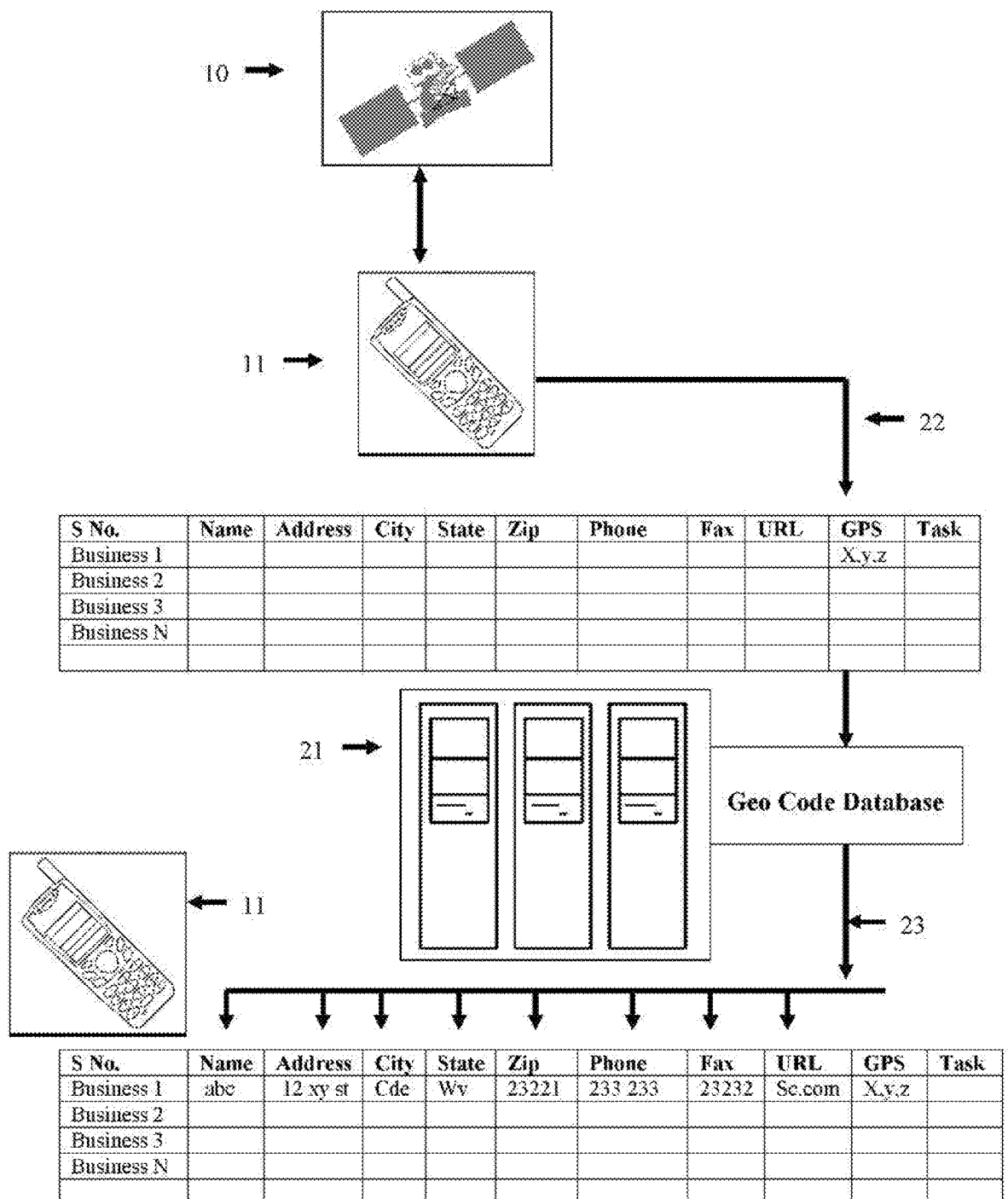
FIG. 2 shows a method of generation of contact list entry in contact list of communication device upon determination of GPS coordinates corresponding to current location of communication device.

According to another aspect of the invention as shown in FIG. 2 means is provided in communication device (11) to determine and save GPS coordinates corresponding to current location of communication device (11) in a new contact list entry; preferably upon instruction by user (22). Additionally, as shown in FIG. 2, means is provided in communication device (11) to determine physical address corresponding to GPS coordinates of current location of communication device (11) by means of geo coding; and save physical address location information into corresponding contact list entry (23). Physical address corresponding to GPS coordinates can be obtained from web server (21) containing geo-code database. Preferably, means is also provided to determine contact information corresponding to other contact list data fields such as name, phone, fax, email address, web site URL etc. (23) corresponding to GPS coordinates of current location of communication device; also from web server (21) containing geo-code database. For example; user standing inside of Wal-Mart in Elkins, W. Va. wants to save contact information of said Wal-Mart store in communication device. According to teachings of present invention, GPS coordinates corresponding to Wal-Mart store in Elkins, W. Va. is determined by GPS receiver of communication device and stored as new contact list entry. Physical address and other contact list data field information corresponding to GPS coordinates is determined by means of geo-coding and retrieved from web server and saved in corresponding contact list entry in communication device. Preferably, contact information database in web server (21) and contact list database in communication device (11) have identical structure.

Figure 3:
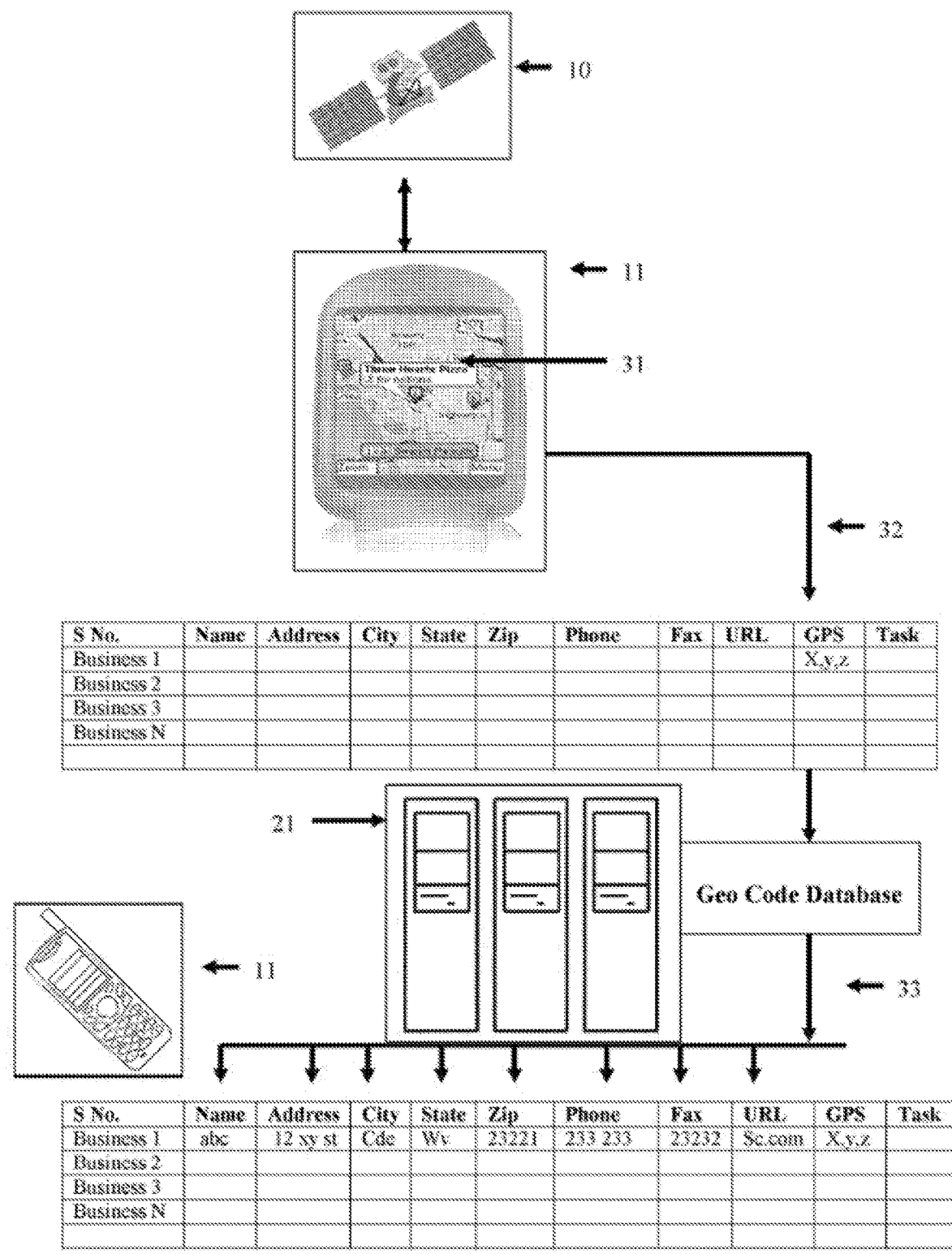
FIG. 3 shows a method of generation of GPS enabled contact list entry in contact list of communication device corresponding to GPS coordinates of a select location on local map displayed on communication device.

According to another aspect of the invention, shown in FIG. 3, means is provided in communication device (11) to display local map (31). User is provided means to choose a point of interest on local map. Preferably communication device (11) is GPS enabled and means is provided in communication device (11) to determine GPS coordinates corresponding to point of interest on local map and thereafter save GPS coordinates into GPS data field of contact list entry in communication device (32). Physical address corresponding to GPS coordinates is determined by means of geo coding (33) from geo code database contained in a web server (21). The geo code information is thereafter transmitted from web server and saved into corresponding data fields in corresponding contact list entry in communication device (33). In addition to physical address, means is also provided to determine additional contact information data corresponding to point of interest on local map such as name, phone, fax, email address, web site URL etc. and subsequently transmit and save additional contact information data into corresponding data fields of corresponding contact list entry (33). Preferably, additional contact information data is also obtained from remote web server housing geo-code database. For example user may choose a point of interest on local map that corresponds to the location of Wal-Mart in Elkins, W.V. According to teachings of the invention, GPS coordinates corresponding to point of interest on local map i.e. Wal-Mart store in Elkins, W.V. is determined at the level of communication device and saved in GPS data field of new contact list entry. Subsequently, physical address and other contact information data corresponding to GPS coordinates of point of interest on local map i.e. Wal-Mart in Elkins, W.V. is retrieved from geo code database saved in web server and thereafter saved in corresponding data fields of corresponding contact list entry in communication device. Preferably, contact information database in web server (21) and contact list database in communication device (11) have identical structure.

Figure 4:
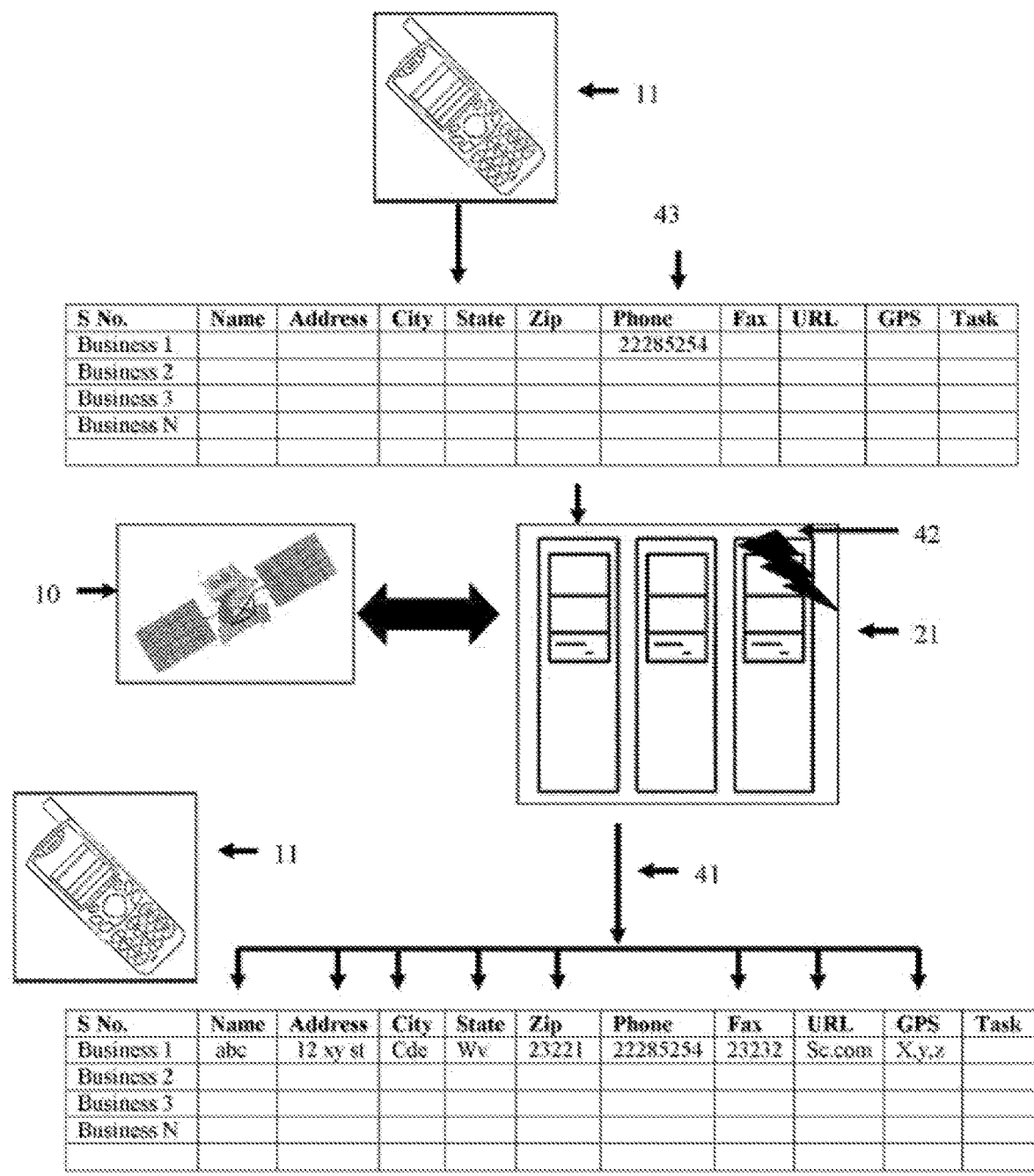
FIG. 4 shows a method of generation of GPS enabled contact list entry in contact list of communication device subsequent to entry of a unique identifier corresponding to entity, such as phone number, into a contact list entry in communication device; and subsequent retrieval of other corresponding contact information data including GPS coordinates from web server.

According to another method of invention, as shown in FIG. 4, contact information database of individuals and businesses is saved in web server (21). Web server (21) is equipped with GPS receiver (42). Means is provided in web server to determine GPS coordinates corresponding to physical addresses saved in contact information database contained therein; and save GPS coordinates into GPS data field of contact list entry of corresponding entity. At the level of communication device (11), means is provided for user to enter unique identifier information for an entity, such as phone number, into corresponding data field of a new contact list entry (43). Subsequently, other contact information data; i.e. physical address, fax, email etc.; and GPS coordinates corresponding to location of entity is automatically downloaded from web server into corresponding data fields of corresponding contact list entry in communication device (41). Preferably, contact information database in web server (21) and contact list database in communication device (11) have identical structure.

Figure 5:
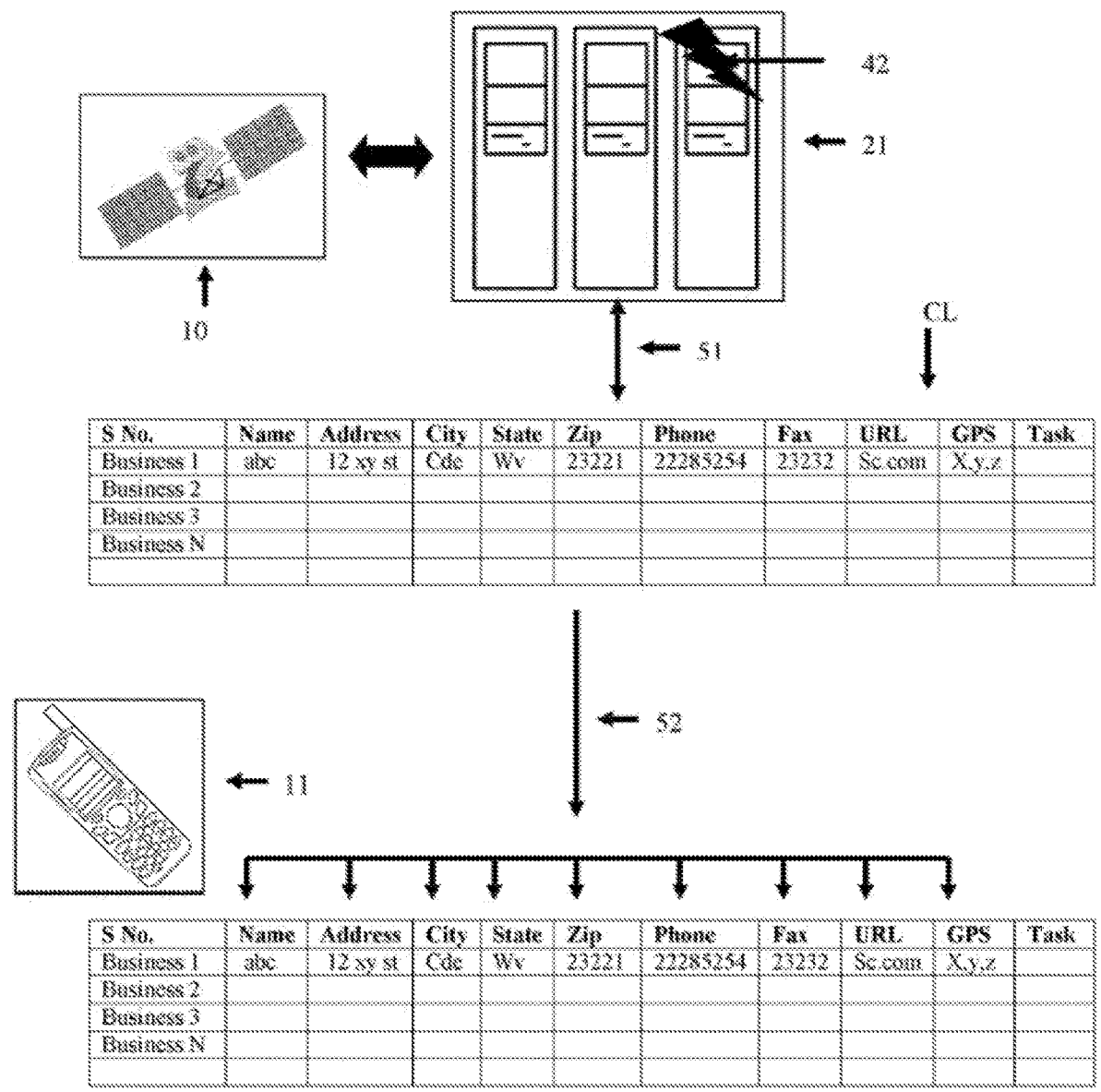
FIG. 5 shows a method of generation of GPS enabled contact list entry in contact list of communication device by means of download of GPS enabled contact information database from web server and subsequent integration with contact information database of communication device.

According to yet another method, as shown in FIG. 5, contact information database (CL) of businesses and individuals is saved in a web server (21). Web server (21) is equipped with GPS receiver (42). Means is provided in web server (21) to determine and save GPS coordinates corresponding to physical addresses contained in contact information database saved therein. Preferably, GPS coordinates of an entity is saved in the GPS data field of corresponding contact list entry. At the level of communication device (11), user is provided means to download contact information of select or all entities from web server into contact list database in communication device (52). Preferably, contact information database (CL) in web server (21) and contact list database in communication device (11) have identical structure. In addition to contact information, GPS coordinates corresponding to entities saved in remote web server is also downloaded and saved into GPS data field of corresponding contact list entries in communication device (52).

Figure 6:
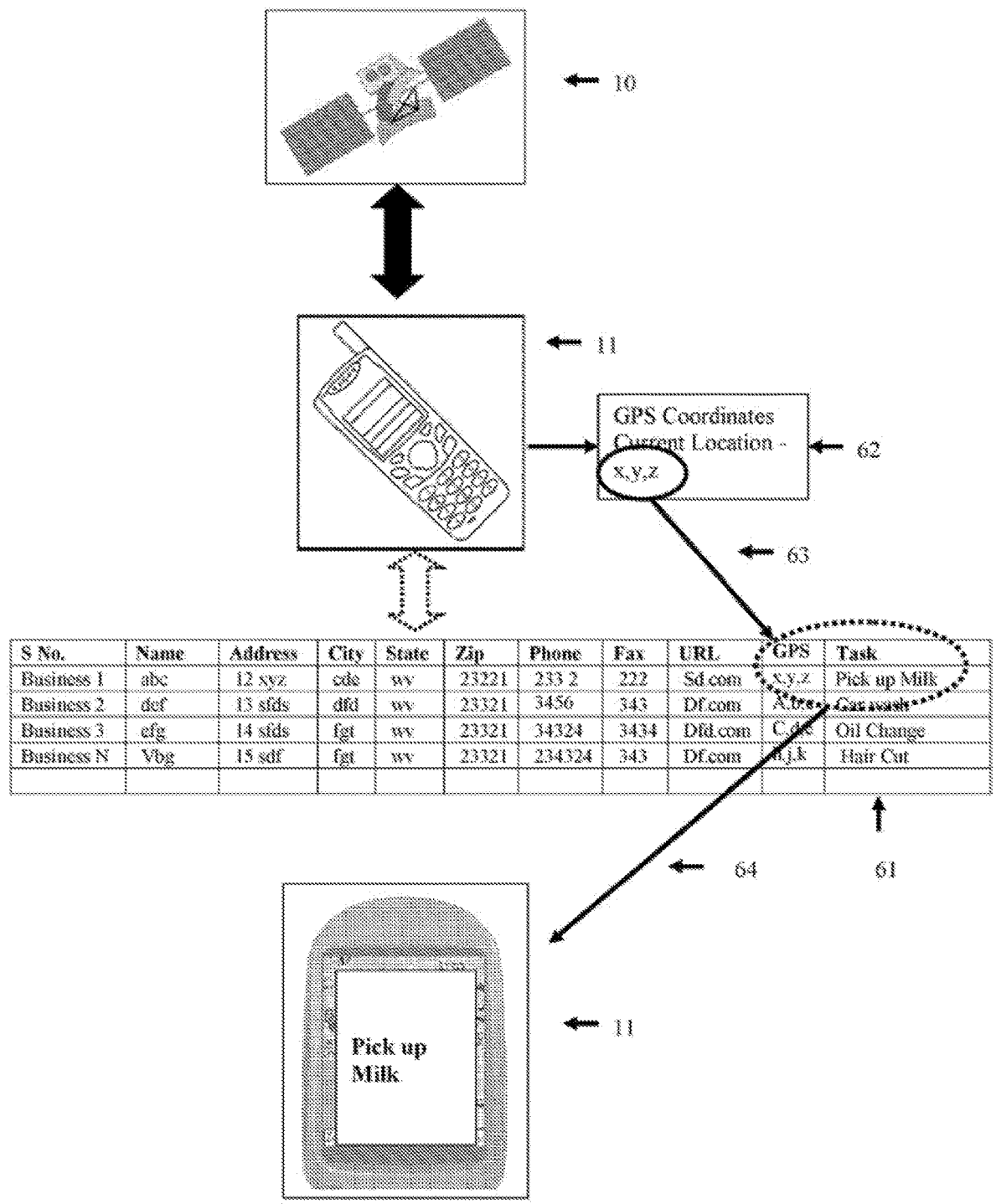
FIG. 6 shows the workings of GPS enabled contact list combined with personal organizer in communication device wherein user is automatically reminded of task when communication device is at the anticipated location of corresponding task.

As shown in FIG. 1, data field for entry of location specific task list is provided in contact list of communication devices. According to yet another aspect of the invention, as shown in FIG. 6, once contact information detail has been fed into the data fields of contact list of communication device by methods described in FIGS. 1-5, means is provided for users to enter location specific tasks into task list data field (61) of corresponding contact information entry. Preferably, means is provided to enter multiple task lists into a contact list entry. Preferably, task list entry can be one or more of text, audio, video, or image. Additionally, as shown in FIG. 6, means is provided in communication device to determine GPS coordinates of current location of communication device (62) and subsequently determine if current location GPS coordinates matches with GPS coordinates contained in one or more contact list entries saved therein (63). If current location GPS coordinates matches with GPS coordinates contained in one or more contact list entry, means is provided in communication device (11) to determine task list associated with said contact list entry (64). Additionally, means is provide in communication device (11) to display said task list as reminder to user. Means is provided for user to delete or edit task list contained in contact list entry once said task has been completed.

Figure 7:
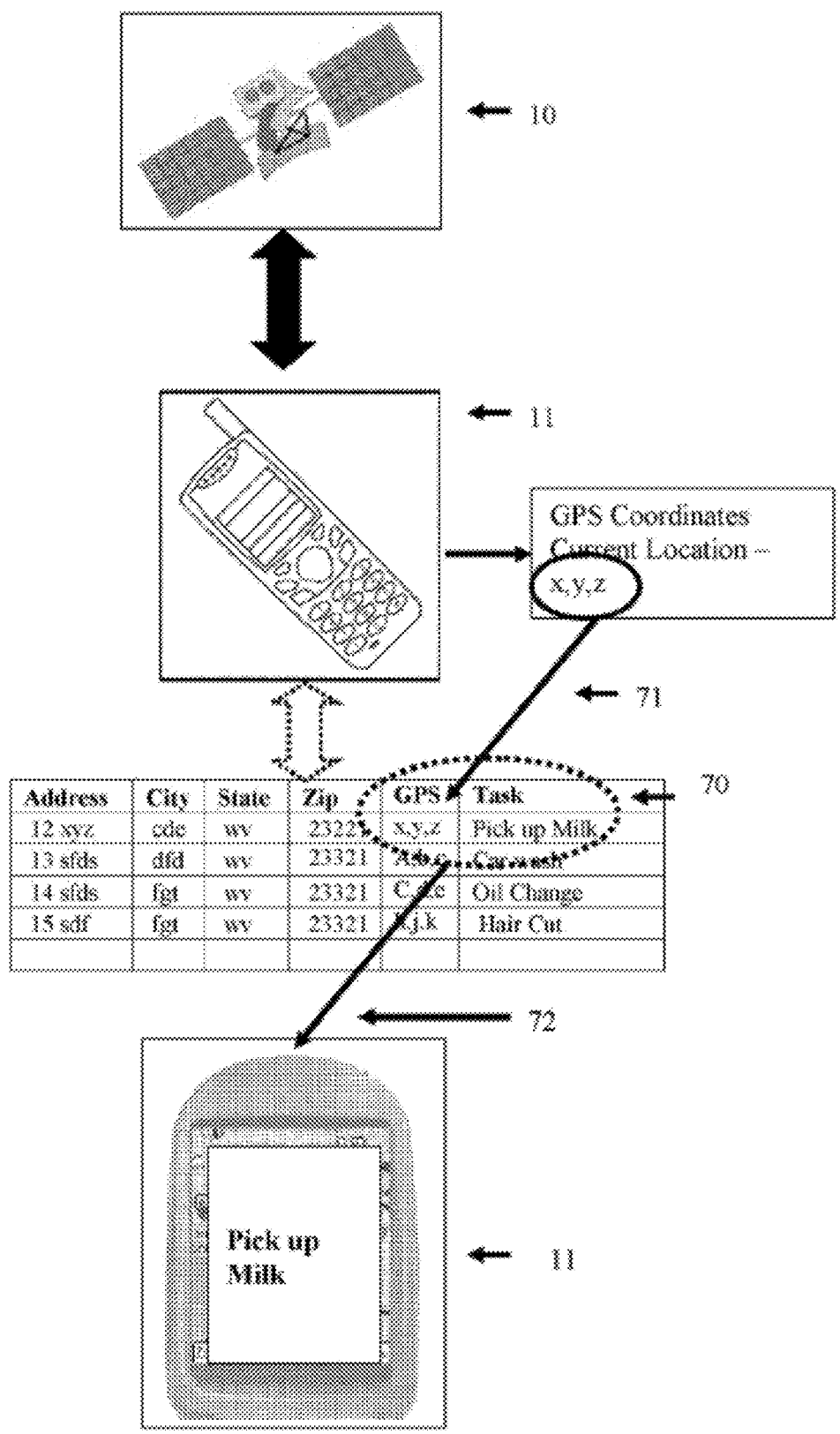
FIG. 7 shows the workings of a GPS enabled personal organizer in communication device wherein user is automatically reminded of task when communication device is at the anticipated location of corresponding task.

According to another aspect of the invention, location based personal organizer system is provided independent of contact list of communication device. According to this method, as shown in FIG. 7, as personal organizer system is provided with means for users to enter task list and anticipated location of tasks contained therein (70). Preferably task entry into contact list can be one or more of text, audio, video, or image. Anticipated location of task list can be entered into personal organizer; 1) manually; 2) by determining current location of communication device, preferably by means of GPS receiver integrated with communication device (this method is particularly applicable when anticipated location of future task corresponds to current location of communication device); and 3) choosing a location on local map displayed on communication device corresponding to anticipated location of a task. In all the above methods, GPS coordinates corresponding to anticipated location of task list is saved with corresponding task list in personal organizer. Preferably, communication device is equipped with GPS receiver in communication link with GPS satellite; and means is provided in communication device (11) to obtain GPS coordinates corresponding to anticipated location of tasks entered into the tasks list. Alternatively, GPS coordinates corresponding to physical addresses contained in task list of communication device can be obtained by means of communication link with web server containing GPS coordinates database. Additionally, as shown in FIG. 7, means is provided in communication device (11) to determine GPS coordinates of current location of communication device and subsequently determine if current location GPS coordinates matches with GPS coordinates contained in one or personal organizer entries (71). If current location GPS coordinates matches with GPS coordinates contained in one or more personal organizer entry, means is provided in communication device to determine corresponding task list (71&72). Additionally, means is provide in communication device (11) to display said task list as reminder to user. Means is provided for user to delete or edit task list contained in personal organizer entry once said task has been completed.

The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention. Some variations of the invention may include: 1) In addition to GPS coordinates, other method of localization of communication device, such as determination of location of cellular tower can be used; 2) although in description cellular phone has been illustrated as an example of communication device, other forms of communication device such as PDA, pager, landline phone, personal computer and other GPS enabled devices should also be considered inclusive; 3) In addition to task list being textual, it can also be in image, audio and video formats. The above list is for illustration purposes only and should in no way be considered all inclusive or limiting.

What is claimed is:

1. A method for providing location-based notifications using (i) a mobile communication device of a user equipped with an on-board GPS device and (ii) a remote geo-code database accessible through a remote server, the remote geo-code database storing contact information linked to geographical locations such that each stored set of GPS coordinates corresponding to a respective geographical location is mapped to a respective set of contact information of an entity located at the respective geographical location, the mobile device configured to be communicable to and from the remote server, the mobile device configured to store and display a first collection of one or more viewable entries, each said viewable entry configured to be linked with a respective geographical location, each said viewable entry configured to store a location-denoting text denoting the respective geographical location and a respective set of GPS coordinates identifying the respective geographical location, each said viewable entry configured to store a respective reminder text denoting a respective task linked with the respective geographical location, each said viewable entry configured to have a respective set of user interfaces, which, when selectively displayed on the mobile device, enable the user, for the respective viewable entry, to at least (a) search for, through use of the remote geo-code database, the respective location-denoting text and the respective set of GPS coordinates and (b) view at least both the respective location-denoting text and the respective reminder text, the method comprising:

the mobile device displaying a first set of one or more user interfaces enabling the user to input a first input text for the respective reminder text of a first viewable entry of the first collection so that the mobile device receives and stores the first input text as the respective reminder text of the first viewable entry subsequently viewable through the respective set of user interfaces thereof;

the mobile device displaying a second set of one or more user interfaces included in the respective set of user interfaces of the first viewable entry, the second set of one or more user interfaces enabling the user to input text on contact information of an entity located at the respective geographical location of the first viewable entry in using the user-inputted contact information to acquire both the respective location-denoting text and the respective set of GPS coordinates of the first viewable entry through use of the remote geo-code database, the second set of one or more user interfaces including at least a first user interface element enabling the user to input a second input text for searching against a first set of one or more data fields of contact information of an entity located at the respective geographical location of the first viewable entry;

the mobile device sending to the remote server a search request including the second input text and indicating a search criterion of the second input text being used to search against the first set of one or more data fields of contact information of an entity, the search request requesting for searching for, based on the search criterion, at least one result entity meeting the search criterion;

the mobile device receiving from the remote server a set of result data of a first result entity including a respective set of contact information of the first result entity and a respective set of GPS coordinates of the first result entity identifying a respective geographical location where the first result entity is located, as a result of the remote server, upon receiving from the mobile device the search request, performing a search operation against the remote geo-code database based on the search criterion and retrieving from the remote geo-code database, as a result of the search operation, the set of result data of the first result entity;

the mobile device setting and storing a first subset of the received respective set of contact information of the first result entity and the received respective set of GPS coordinates of the first result entity, as the respective location-denoting text of the first viewable entry and the respective set of GPS coordinates of the first viewable entry, respectively; and the mobile device displaying an indication indicating a presence of the respective reminder text of the first viewable entry to remind the user of performing of the respective task denoted by the respective reminder text when a set of contemporaneous GPS coordinates of the mobile device corresponding to a contemporaneous geographical location of the mobile device, as captured by the on-board GPS device of the mobile device, corresponds with the stored respective set of GPS coordinates of the first viewable entry; and wherein the second set of user interfaces include at least a first user interface enabling the user to input a set of one or more identifier values for a respective set of one or more data fields of contact information of an entity located at the respective geographical location of the first viewable entry, in uniquely identifying an entity located at the respective geographical location of the first viewable entry through use of the remote geo-database; and wherein the set of one or more identifier values for the respective set of one or more data fields of contact information of an entity located at the respective geographical location of the first viewable entry, is calculated to be used as unique identifier information to uniquely identify an entity located at the respective geographical location of the first viewable entry through use of the remote geo-code database.

2. The method of claim 1, wherein the set of one or more identifier values for the respective set of one or more data fields of contact information of an entity located at the respective geographical location of the first viewable entry, the inputting of which is enabled by the first user interface of the second set of user interfaces in uniquely identifying an entity located at the respective geographical location of the first viewable entry through use of the remote geo-database, comprises a phone number value for a data field indicating a phone number of an entity located at the respective geographical location of the first viewable entry.

3. The method of claim 1, wherein, for each viewable entry of the first collection, the respective location-denoting text includes a name of an entity located at the respective geographical location.

4. The method of claim 1, wherein, for each viewable entry of the first collection, the respective location-denoting text includes an address of an entity located at the respective geographical location.

5. The method of claim 1, wherein the indication indicating the presence of the respective reminder text of the first viewable entry, as displayed by the mobile device, comprises the respective reminder text of the first viewable entry.

6. The method of claim 1, wherein the first user interface element of the second set of one or more user interfaces enables the user to input a phone number value as the second input text for searching against one data field indicating a phone number of an entity located at the respective geographical location of the first viewable entry.

7. The method of claim 1, wherein the first user interface element of the second set of one or more user interfaces is included in the first user interface of the second set of one or more user interfaces.

* * * * *

(12) INTER PARTES REVIEW CERTIFICATE (3395th)

United States Patent
Ratnakar

(10) Number: US 10,594,854 K1
(45) Certificate Issued: Jan. 26, 2024

(54) LOCATION BASED PERSONAL ORGANIZER

(71) Applicant: Nitesh Ratnakar

(72) Inventor: Nitesh Ratnakar

(73) Assignee: MIRA ADVANCED TECHNOLOGY SYSTEMS INC.

Trial Number:

IPR2022-00742 filed Apr. 5, 2022

Inter Partes Review Certificate for:

Patent No.: 10,594,854
Issued: Mar. 17, 2020
Appl. No.: 16/427,278
Filed: May 30, 2019

The results of IPR2022-00742 are reflected in this inter partes review certificate under 35 U.S.C. 318(b).

INTER PARTES REVIEW CERTIFICATE
U.S. Patent 10,594,854 K1
Trial No. IPR2022-00742
Certificate Issued Jan. 26, 2024

AS A RESULT OF THE INTER PARTES REVIEW PROCEEDING, IT HAS BEEN DETERMINED THAT:

Claims 1-7 are cancelled.

\* \* \* \* \*